(12) United States Patent
Ogata (10) Patent No.: US 9,124,438 B2
(45) Date of Patent: Sep. 1, 2015

(54) NETWORK COMMUNICATION APPARATUS, NETWORK COMMUNICATION METHOD, AND PROGRAM

(75) Inventor: Hideaki Ogata, Yokohama (JP)

(73) Assignee: SEIKO EPSON CORPORATION, Tokyo (JP)

(*) Notice: Subject to any disclaimer, the term of this patent is extended or adjusted under 35 U.S.C. 154(b) by 81 days.

(21) Appl. No.: 13/366,986

(22) Filed: Feb. 6, 2012

(65) Prior Publication Data
US 2012/0201245 A1    Aug. 9, 2012

(30) Foreign Application Priority Data
Feb. 7, 2011 (JP) ................. 2011-023766

(51) Int. Cl.
*H04L 12/18* (2006.01)
*H04L 29/12* (2006.01)

(52) U.S. Cl.
CPC ......... *H04L 12/1886* (2013.01); *H04L 61/2015* (2013.01); *H04L 61/6086* (2013.01)

(58) Field of Classification Search
CPC ......... H04L 45/00; H04L 47/00; H04L 45/16; H04L 12/56; H04L 12/18; H04L 12/1886; H04L 61/6086; H04L 61/2015; H04W 24/02
USPC ............. 370/229, 230, 230.1, 254, 255, 312, 370/390, 392; 709/235
See application file for complete search history.

(56) References Cited

U.S. PATENT DOCUMENTS

| | | | |
|---|---|---|---|
| 6,389,475 B1 * | 5/2002 | Speakman et al. ............ 709/232 |
| 7,373,394 B1 * | 5/2008 | Li et al. ........................ 709/219 |
| 7,764,683 B2 * | 7/2010 | DiGiorgio et al. ............ 370/390 |
| 8,014,368 B2 * | 9/2011 | Kim et al. ..................... 370/338 |
| 8,130,636 B2 * | 3/2012 | Demachi et al. .............. 370/218 |
| 8,189,584 B2 * | 5/2012 | Fernandez Gutierrez .... 370/390 |
| 2001/0046065 A1 * | 11/2001 | Furukawa et al. ........... 358/1.15 |
| 2002/0116529 A1 * | 8/2002 | Hayden ........................ 709/245 |
| 2002/0194361 A1 * | 12/2002 | Itoh et al. ..................... 709/233 |
| 2003/0084191 A1 * | 5/2003 | Yamamoto .................... 709/249 |

(Continued)

FOREIGN PATENT DOCUMENTS

| | | | |
|---|---|---|---|
| JP | 2004-120580 A | 4/2004 |
| JP | 2009-015716 A | 1/2009 |

OTHER PUBLICATIONS

He et al. "Enhanced power saving mechanism for supporting multicast services in 802.11 wireless LANs", Jun. 1, 2009, Journal of Zhejiang University Science A, pp. 828-833.*

(Continued)

*Primary Examiner* — Gary Mui
*Assistant Examiner* — Michael Phillips
(74) *Attorney, Agent, or Firm* — Maschoff Brennan (57) ABSTRACT

A network communication apparatus which can transmit multicast packets includes a communication interface unit that has a plurality of IP addresses allocated thereto and transmits multicast packets using each of the plurality of IP addresses as a transmission source, and a multicast control unit that controls transmission of the multicast packets from the communication interface unit, groups the plurality of IP addresses in a plurality based on predetermined criteria, and sequentially transmits the multicast packets using one IP address belonging to each group as a transmission source with respect to all the IP addresses in each group.

9 Claims, 8 Drawing Sheets

(56) References Cited

U.S. PATENT DOCUMENTS

| | | | |
|---|---|---|---|
| 2003/0133443 A1* | 7/2003 | Klinker et al. | 370/353 |
| 2003/0231629 A1* | 12/2003 | Banerjee et al. | 370/390 |
| 2004/0064506 A1 | 4/2004 | Ohara | |
| 2004/0258066 A1* | 12/2004 | Chen et al. | 370/390 |
| 2005/0036443 A1* | 2/2005 | Collins | 370/216 |
| 2006/0083253 A1* | 4/2006 | Park et al. | 370/401 |
| 2007/0121574 A1* | 5/2007 | Igarashi et al. | 370/351 |
| 2007/0140242 A1* | 6/2007 | DiGiorgio et al. | 370/390 |
| 2007/0201413 A1* | 8/2007 | Laine et al. | 370/338 |
| 2008/0134269 A1* | 6/2008 | Sim et al. | 725/114 |
| 2008/0263130 A1* | 10/2008 | Michalowitz et al. | 709/202 |
| 2009/0187941 A1* | 7/2009 | Smith | 725/35 |
| 2009/0285211 A1* | 11/2009 | Muramoto et al. | 370/390 |
| 2009/0288162 A1* | 11/2009 | Shaffer et al. | 726/22 |
| 2010/0265867 A1* | 10/2010 | Becker et al. | 370/312 |
| 2011/0055380 A1* | 3/2011 | Yockey et al. | 709/224 |
| 2011/0072148 A1* | 3/2011 | Begen et al. | 709/231 |
| 2011/0085548 A1* | 4/2011 | Fernandez Gutierrez | 370/390 |
| 2012/0185633 A1* | 7/2012 | Sano | 710/316 |
| 2014/0016638 A1* | 1/2014 | Chen et al. | 370/390 |

OTHER PUBLICATIONS

Veizades, et al., "Service Location Protocol", RFC 2165, Jun. 1997, pp. 1-72.

Guttman, et al., "Service Location Protocol, Version 2", RFC 2608, Jun. 1999, pp. 1-54.

* cited by examiner

| DEVICE NAME | IP ADDRESS |
|---|---|

SEARCH  ~201    CANCEL

| DEVICE NAME | IP ADDRESS |
|---|---|
| ○ SCANNER 102 | fe80::290:ccff:fe50:1001 |
| ● PRINTER 103 | fe80::290:ccff:fe50:2002 |
| ○ SCANNER 104 | 2001:2f8:43:1000:290:3:100:1 |
| ○ PRINTER 105 | 2001:2f8:43:1000:290:3:100:2 |

RESEARCH    202    DETAILS

| DEVICE NAME | PRINTER 103 |
|---|---|
| MODEL NAME | ABCDE LP-A500 |
| COLOR PRINTING | POSSIBLE |
| PRINTING SPEED (COLOR) | 5 SHEETS/MINUTE |
| PRINTING SPEED (MONOCHROME) | 25 SHEETS/MINUTE |
| LOCATION | ROOM 0409 |

RETURN

NETWORK COMMUNICATION APPARATUS, NETWORK COMMUNICATION METHOD, AND PROGRAM

BACKGROUND

1. Technical Field

The present invention relates to a network communication technique, and more particularly to an IP multicast technique.

2. Related Art

At present, particularly in offices, printers, scanners, multifunction machines thereof, or the like are connected to an IP network (hereinafter, referred to as a "network"), and a PC or the like provided with a network communication apparatus (hereinafter, referred to as a "communication apparatus") may perform printing by transmitting printing data to the printer or receive scanned image data from the scanner via the network.

At this time, as disclosed in JP-A-2004-120580 and SLP (Service Location Protocol), RFC2165 and RFC2608, there has been proposed a technique in which a search packet is transmitted from a communication apparatus in a multicast manner, and a response thereto is received, thereby searching for peripheral devices such as printers, scanners, multifunction machines thereof, or the like connected to a network.

IP addresses may be allocated to the communication apparatus and the peripheral device thereof connected to the network. There are mainly two address systems, IPv4 and IPv6, as the IP addresses, and either one of IPv4 or IPv6, or both of them, may be allocated to each device. Here, if the IPv6 address is allocated, a plurality of different IPv6 addresses may be allocated to one communication interface (hereinafter, referred to as a "communication I/F"). In addition, if IPv4 address is allocated as well, in a case where the communication apparatus includes a plurality of communication I/Fs, a different IPv4 address can be allocated for each communication I/F. In other words, there are cases where a plurality of different IP addresses may be allocated to one communication apparatus.

At this time, if a search packet is transmitted in a multicast manner, the respective IP addresses allocated to the communication apparatus are used as transmission sources, and thus a plurality of multicast packets are transmitted. That is to say, a number of multicast packets corresponding to the number of the IP addresses allocated to the communication apparatus are simultaneously transmitted. Here, the simultaneous transmission of the packets means that a large volume of packets are delivered within a very short time, and the packets are delivered substantially at the same time.

However, since the built-in type peripheral device such as a printer, a scanner, or a multifunction machine thereof has relatively small resources, the device may not be able to process the incoming plurality of multicast packets which are simultaneously transmitted from the communication apparatus. In other words, there is concern that the peripheral device may lose a portion of the multicast packets.

If a plurality of multicast packets are simultaneously transmitted from the communication apparatus, and a plurality of peripheral devices simultaneously return response packets to the multicast packets, there is concern that network traffic is increased, and this may have an adverse effect on the communication of other devices connected to the network.

In addition, this problem is not limited to the transmission of multicast packets. For example, the problem also influences a case where each IP address is used as a transmission source, and unicast packets are simultaneously transmitted.

SUMMARY

An advantage of some aspects of the invention is to control transmission of packets from a communication apparatus to which a plurality of IP addresses have been allocated.

Another advantage of some aspects of the invention is to control transmission of multicast packets from a communication apparatus such that peripheral devices having relatively small resources such as printers, scanners, or multifunction machines thereof do not lose a portion of the multicast packets.

Still another advantage of some aspects of the invention is to control transmission of multicast packets from a communication apparatus so as to alleviate the increase in network traffic.

According to an aspect of the invention, there is provided a network communication apparatus which can transmit multicast packets including a communication interface unit that has a plurality of IP addresses allocated thereto and transmits multicast packets using each of the plurality of IP addresses as a transmission source; and a multicast control unit that controls transmission of the multicast packets from the communication interface unit, groups the plurality of IP addresses in a plurality based on predetermined criteria, and sequentially transmits the multicast packets using one IP address belonging to each group as a transmission source with respect to all the IP addresses in each group.

Thereby, it is possible to restrict the maximum number of multicast packets which are simultaneously transmitted from the network communication apparatus.

The criteria used when the multicast control unit performs the grouping may be a kind of addressing classification of each IP address.

Thereby, it is possible to group a plurality of IP addresses in a plurality based on predetermined criteria.

The multicast packets may have search data for searching for devices or services present on a network.

Thereby, the network communication apparatus can search for devices or services present on a network.

After response data to search data included in a transmitted multicast packet is received or after a predetermined time-out time has elapsed in a first group, the multicast control unit may transmit a multicast packet using an IP address which belongs to the first group and has not been used to transmit a multicast packet yet, as a transmission source.

Thereby, it is possible to restrict the number of multicast packets which are simultaneously transmitted from the first group.

According to the aspect of the invention, it is possible to control transmission of packets from a communication apparatus to which a plurality of IP addresses have been allocated.

In addition, according to the aspect of the invention, it is possible to control transmission of multicast packets from a communication apparatus such that a peripheral device having relatively small resources such as a printer, a scanner, or a multifunction machine thereof does not lose a portion of the multicast packets.

Further, according to the aspect of the invention, it is possible to control transmission of multicast packets from a communication apparatus so as to alleviate the increase in network traffic.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
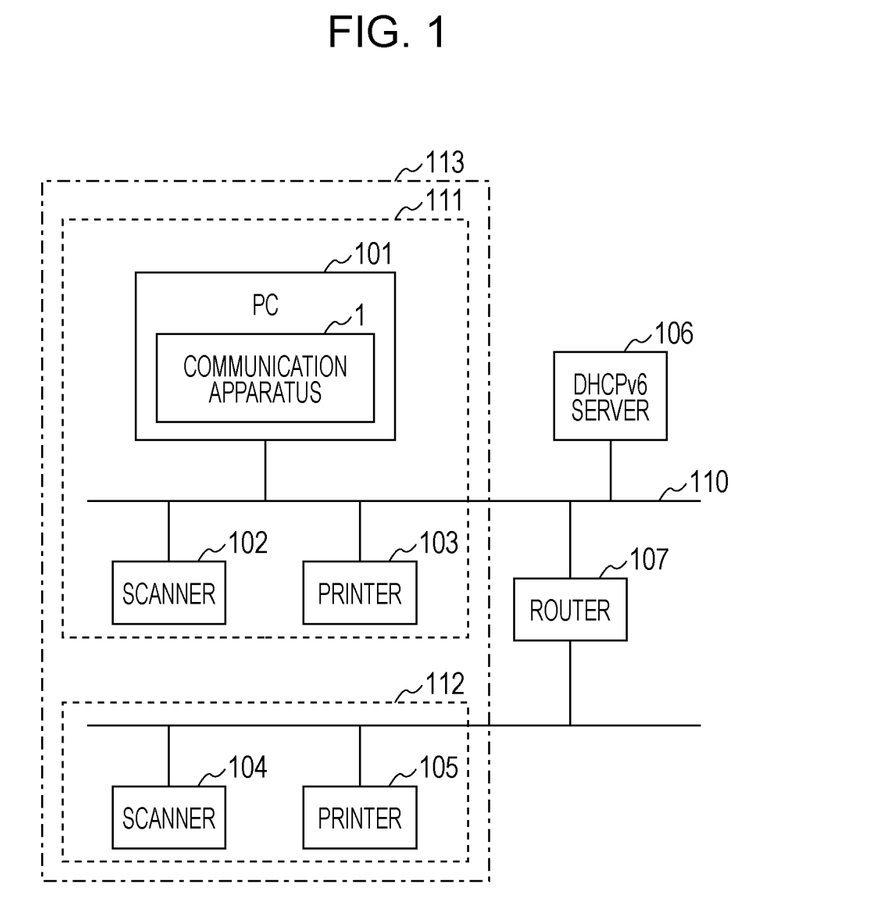
FIG. 1 is a diagram illustrating a network configuration of a network communication apparatus and peripheral devices thereof according to an embodiment of the invention.

FIG. 1 is a diagram illustrating a network configuration of a network communication apparatus and peripheral devices thereof according to an embodiment of the invention. Hereinafter, FIG. 1 will be described.

A network 110 is connected to a PC 101, a scanner 102, a printer 103, a scanner 104, a printer 105, a router 107, and a DHCPv6 server 106 in a wired or wireless manner. The PC 101 belongs to the same network group 111 (that is, the same link-local group) as the scanner 102 and the printer 103. The scanner 104 and the printer 105 belong to the same network group 112. The router 107 connects the network group 111 to the network group 112. Hereinafter, the respective devices will be described.

The router 107 supports both IPv4 and IPv6 and provides a gateway to each of the network groups 111 and 112. The router 107 transmits (routes) IP packets which have been transmitted from a certain device, to a router or a device of another network group based on a destination IP address.

The router 107 supports IPv6 and thus has an RA (Router Advertisement) function. In addition, the router 107 automatically allocates IPv6 addresses to devices belonging to the network groups 111 and 112 managed by the router 107 according to the RA function. The IPv6 addresses which are automatically allocated according to the RA function are referred to as stateless addresses.

The router 107 manages a multicast group 113. The multicast group includes a plurality of devices on the network. The multicast group may include devices of different link-local groups. A predetermined multicast group address may be allocated to the multicast group. That is to say, the devices participating in the multicast group have the same multicast group address. In addition, the router 107 stores the multicast group address and the IP addresses of the devices participating in the multicast group so as to be correlated with each other. When receiving multicast packets where the multicast group address is a destination, the router 107 transmits the multicast packets to all the devices participating in the multicast group. For example, in FIG. 1, the PC 101, the scanner 102, the printer 103, the scanner 104, and the printer 105 participate in the multicast group 113, and when the router 107 receives multicast packets to be transmitted to the multicast group 113, the router 107 transmits the multicast packets to the PC 101, the scanner 102, the printer 103, the scanner 104, and the printer 105.

The DHCPv6 server 106 allocates IPv6 addresses to devices connected to the network 110. For example, when a device connected to the network requests the DHCPv6 server 106 to allocate an IPv6 address, the DHCPv6 server 106 allocates an IPv6 address to the device. For example, in FIG. 1, when the PC 101 requests the DHCPv6 server 106 to allocate an IPv6 address, the DHCPv6 server 106 allocates the IPv6 address "2001:2f8:43:1000:290:3:20:1" to the PC 101. In addition, the DHCPv6 server 106 may provide an IP address of a DNS server, a default gateway, or the like, to the device. The IPv6 address allocated by the DHCPv6 server 106 is referred to as a stateful address.

Figure 5A:
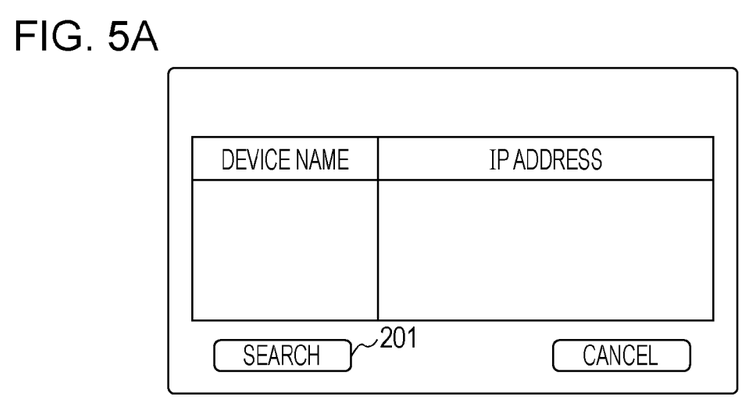
FIGS. 5A to 5C are diagrams illustrating a screen display example when the communication apparatus searches for a peripheral device on the network.
Figure 5B:
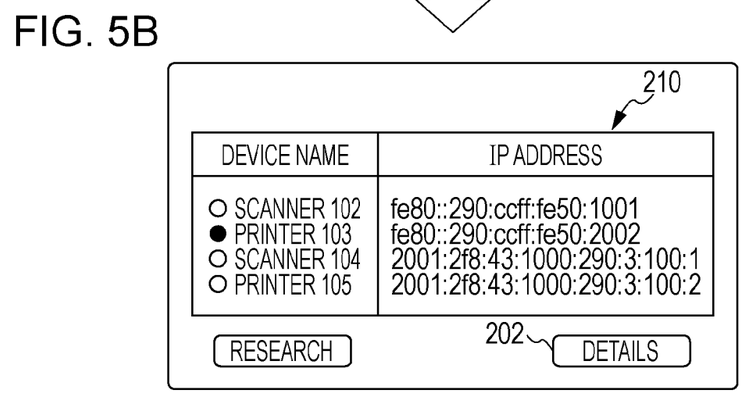
Figure 5C:
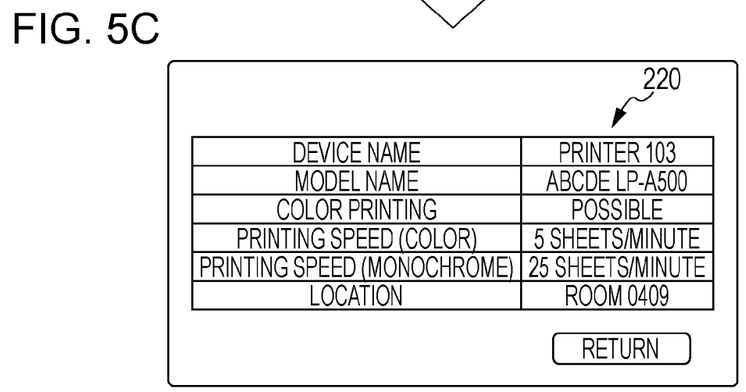

The PC 101 includes a communication apparatus 1 for performing communication via the network 110. The communication apparatus 1 can search for devices or services connected to the network through a protocol (for example, an SLP) for searching for services. For example, the communication apparatus 1 transmits a service search request packet in which a service search condition is described in a multicast manner, and receives a response packet from a device which is suitable for the search conditions, thereby searching for a device or a service. For example, in FIG. 1, when the communication apparatus 1 transmits a service search request packet having "printer or scanner" as a search condition to the multicast group 113 which is a destination, the communication apparatus 1 can receive a response packet from the printers and the scanners 102 to 105. In addition, when the communication apparatus 1 transmits a request for detailed information to the printers or the scanners of which IP addresses are described in the response packet as destinations, the communication apparatus can receive a response of the detailed information (for example, information as shown in FIG. 5C) from the printers or the scanners.

The printers and scanners 102 to 105 are examples of the peripheral device 20 according to an embodiment of the invention. The printers and scanners 102 to 105 support both IPv4 and IPv6. The printer 103 and the printer 105 receive printing data which is transmitted from the PC 101 via the network 110 and can perform printing. The scanner 102 and the scanner 104 can transmit scanned image data to the PC 101 via the network 110. The printers and scanners 102 to 105 support the above-described protocol (for example, an SLP) for searching for services. Therefore, when receiving a service search request packet having "printer or scanner" as a search condition from the PC 101, the printers and scanners 102 to 105 sends a response packet indicating being suitable for the search condition to the PC 101.

Figure 2:
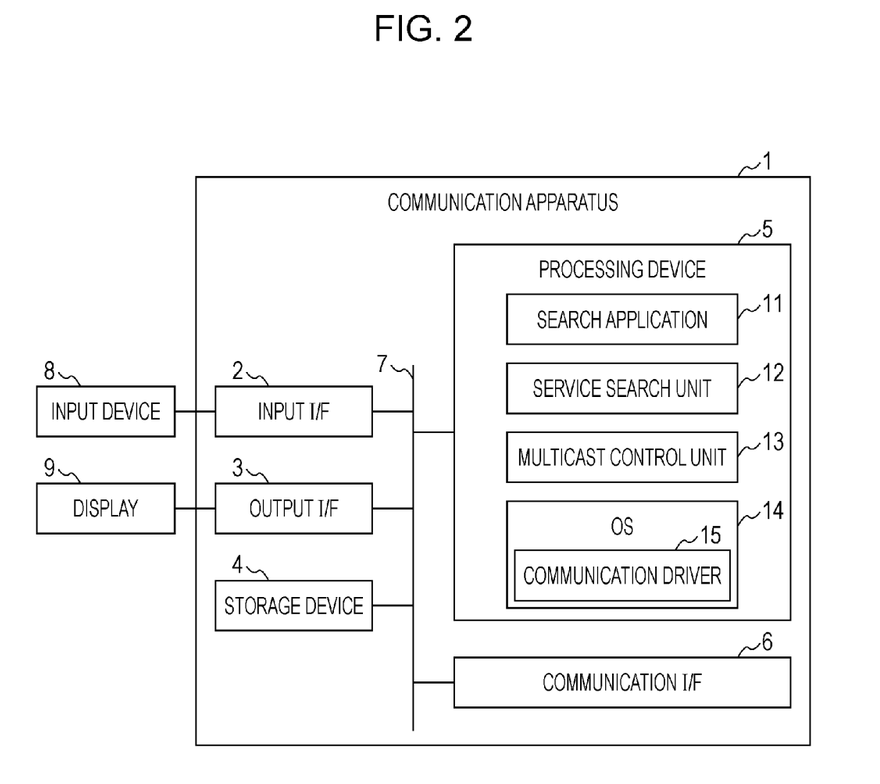
FIG. 2 is a diagram illustrating a configuration of the communication apparatus.

FIG. 2 is a diagram illustrating a configuration of the communication apparatus 1. Hereinafter, FIG. 2 will be described.

The communication apparatus 1 includes an input I/F 2, an output I/F 3, a communication I/F 6, a storage device 4, a processing device 5, and a bus 7 connecting them to each other.

The input I/F 2 is an I/F for receiving an input from a user and is connected to an input device 8 such as, for example, a keyboard, a mouse, a touch panel display, or a remote controller. For example, in FIGS. 5A to 5C described later, when a user presses a button on the screen through an operation of the mouse, a signal indicating the button pressing is input to the processing device 5 via the input I/F 2.

The output I/F 3 is an I/F for outputting video, audio, and the like, and is connected to, for example, a touch panel display, a liquid crystal display, a speaker, or the like. For example, the screen image shown in FIGS. 5A to 5C described later is generated by the processing device 5 and is displayed on a display 9 via the output I/F 3.

The communication I/F 6 transmits data generated by the processing device 5 to the network or inputs data received from the network to the processing device 5. For example, the communication I/F 6 is an I/F for connection to a wired or wireless LAN (Local Area Network), and transmits and receives IP packets. For example, transmission of multicast packets and reception of response packets thereto in FIG. 3 described later are performed by the communication I/F 6.

The storage device 4 stores computer programs (hereinafter, referred to as "programs") executed by the processing device 5, data generated by the programs, and the like. The storage device 4 stores, for example, a multicast group address, and the like. Data stored in the storage device 4 is not removed even if power is not supplied to the communication apparatus 1. The storage device 4 is constituted by, for example, an HDD (Hard Disk Drive), a flash memory, or the like.

The processing device 5 includes a CPU (Central Processing Unit), a ROM (Read Only Memory), a RAM (Random Access Memory), and the like, and reads programs from the storage device 4 and executes the read programs. The programs executed by the processing device 5 are, for example, a search application 11, a service search unit 12, a multicast control unit 13, an OS (Operating System) 14, and the like. Hereinafter, the respective programs will be described.

The OS 14 controls the overall programs executed by the processing device 5. For example, the OS 14 performs execution scheduling of each application and memory management. The OS 14 manages IP addresses set in the communication I/F 6 via a communication driver 15. Therefore, each application inquires of the OS 14, and thereby can know IP addresses set in the communication I/F 6.

When receiving a request for search for peripheral devices (for example, printers or scanners) from a user via the input device 8, the search application 11 reads a predetermined multicast group address from the storage device 4 and requests the service search unit 12 to search for a device suitable for the search condition by using the address as a destination. In addition, the search application 11 displays a screen of the list of the peripheral device 20 on the network and detailed information of each device, as shown in FIGS. 5A to 5C described later, on the display 9. In addition, the search application 11 receives an input to the screen from the input device 8.

The service search unit 12 searches for a predetermined device or a predetermined service which is connected to the network using a protocol (for example, an SLP) for searching for services. For example, the service search unit 12 transmits a service search request packet in which a service search condition is described in a multicast manner. In addition, the service search unit 12 receives a response packet for a device suitable for the search condition, and specifies a device name and an IP address of the responding device, thereby searching for the device providing the service.

When a plurality of IP addresses have been allocated to the communication I/F 6, the multicast control unit 13 performs control such that multicast packets equal to or more than a predetermined number are not transmitted at the same time.

For example, the multicast control unit 13 groups a plurality of IP addresses allocated to the communication I/F as in a plurality based on predetermined criteria. In addition, a control is performed such that only one multicast packet is transmitted from one group at a certain time point. In other words, a plurality of multicast packets are prevented from being transmitted at the same time from one group. Further, after transmission of the one multicast packet is complete, a multicast packet is transmitted using another IP address belonging to the group as a transmission source. Thereafter, the process is repeated until transmission of multicast packets is completed using all the IP addresses belonging to the group as transmission sources. In addition, the multicast control unit 13 performs control such that the respective groups transmit multicast packets in parallel (in multi-tasking). Thereby, the multicast control unit 13 can perform control such that the upper limit of the number of multicast packets which are simultaneously transmitted becomes the number of groups.

When a plurality of IP addresses are grouped in a plurality, the grouping is performed based on a kind of addressing classification of IP addresses, for example, whether an IP address allocated to the communication I/F 6 is an IPv4 address or an IPv6 address, what scope of an IP address the allocated IP address is, how the IP address is allocated, or the like. For example, the grouping may be performed based on whether an IP address is an IPv4 address, an IPv6 link-local address, an IPv6 stateless address, an IPv6 stateful address, or an IPv6 manually-set address, or the like.

In addition, the grouping may be performed based on other criteria. For example, the grouping may be performed such that priority is given to each IP address, and an IP address having high priority becomes a leader of each group. In addition, for example, the same kind of IP addresses may be grouped randomly. Further, for example, a user may group the same kind of IP addresses arbitrarily.

Hereinafter, the control performed by the multicast control unit 13 will be described in more detail.

Figure 3:
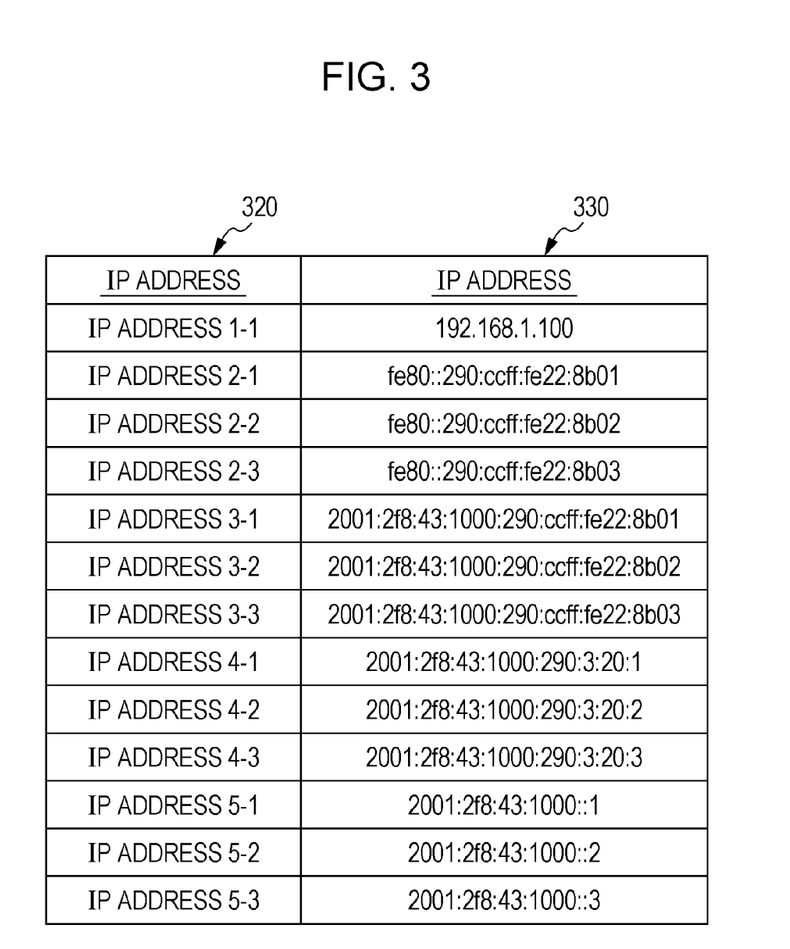
FIG. 3 is a diagram illustrating an example of the IP addresses allocated to the communication apparatus.

FIG. 3 is a diagram illustrating an example of the IP addresses allocated to the communication apparatus 1.

Figure 4A:
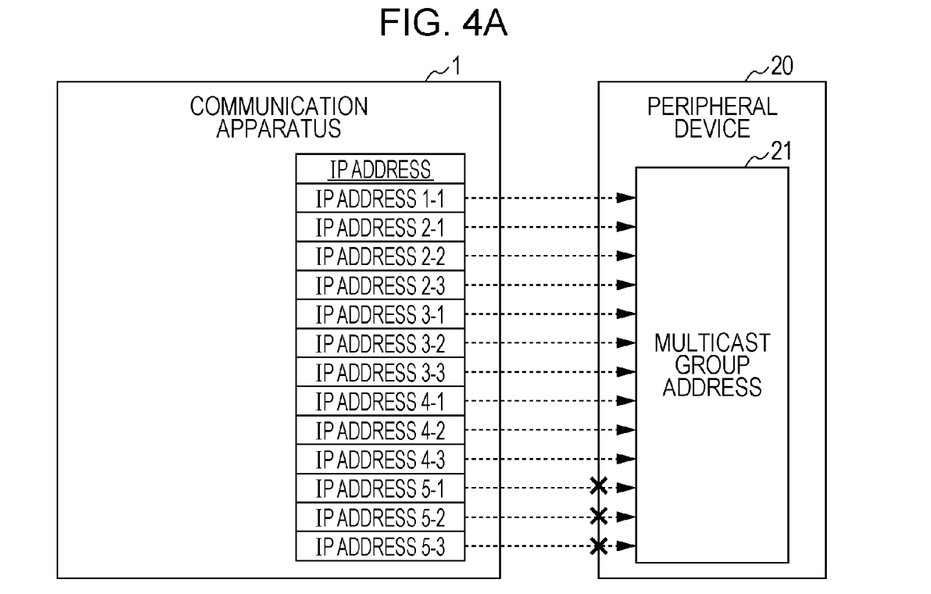
FIGS. 4A and 4B are diagrams illustrating an example where the communication apparatus to which a plurality of different IP addresses have been allocated transmits multicast packets to the peripheral device.
Figure 4B:
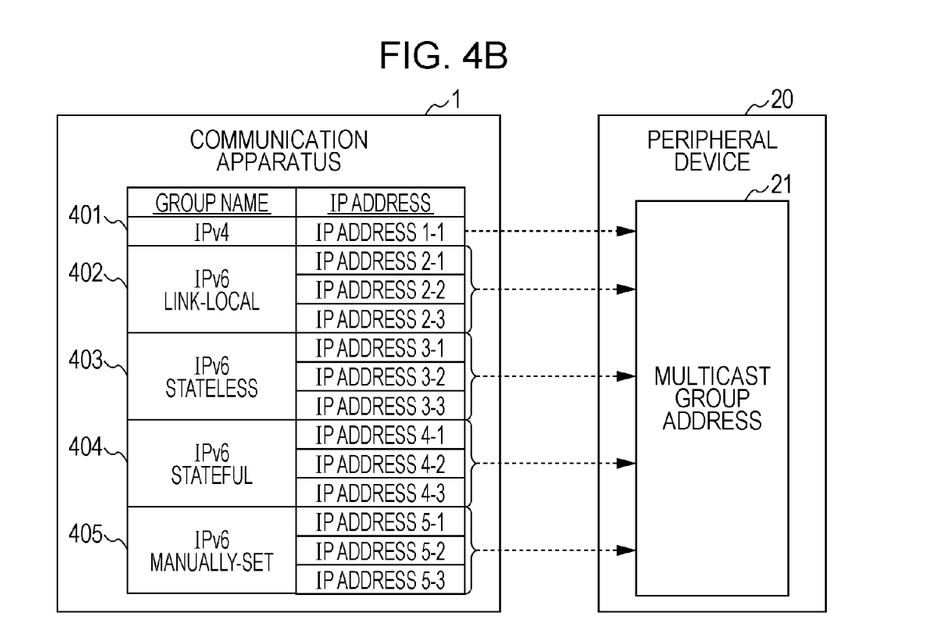

FIGS. 4A and 4B are diagrams illustrating an example of the case where the communication apparatus 1, to which a plurality of different IP addresses have been allocated, transmits multicast packets to the peripheral device 20.

Hereinafter, there will be made a description of a problem when the communication apparatus 1 to which a plurality of different IP addresses have been allocated transmits multicast packets to the peripheral device 20 and an example where an embodiment of the invention is applied to the problem, with reference to FIGS. 3 to 4B.

As shown in FIG. 3, a plurality of different IP addresses can be allocated to the communication apparatus 1 which supports both IPv4 and IPv6. This is because a plurality of IPv6 addresses can be allocated to one communication I/F 6 in the IPv6 specification. In addition, if the communication apparatus 1 includes a plurality of communication I/Fs 6, different IPv4 addresses can be allocated to each communication I/F 6. Therefore, for example, it is assumed that a total of thirteen IP addresses of one IPv4 address and twelve IPv6 addresses have been allocated to the communication I/F 6 of the communication apparatus 1 as shown in FIG. 3. In addition, the "IP address 1-1" and the like described in the IP address 320 is an alias of the IP address 330 allocated to the communication apparatus 1, and is added for convenience of description of the present specification. For this reason, the "IP address 1-1" and the like described in the IP address 320 is not data which is necessarily managed within the communication apparatus 1.

FIG. 4A is a diagram illustrating an example where the communication apparatus 1 to which thirteen IP addresses shown in FIG. 3 are allocated transmits multicast packets in a normal manner.

At this time, the communication apparatus 1 simultaneously transmits a plurality of multicast packets to the multicast group address 21 which is a destination, using each of the allocated IP addresses as a transmission source. Therefore, it is necessary for the peripheral device 20 to receive the plurality of multicast packets which have been simultaneously transmitted. However, the built-in type peripheral device 20 such as the printer or the scanner has relatively small resources, and thus the number of packets which can be received simultaneously is restricted.

For example, it is assumed that the number of packets which can be simultaneously received by the peripheral device 20 is a maximum of ten. In this case, as shown in FIG. 4A, if the communication apparatus 1 simultaneously transmits the thirteen multicast packets to the multicast group address 21, the communication apparatus 1 loses three packets. If the peripheral device 20 receives other packets, more packets are lost. In other words, the peripheral device 20 loses a portion of the search packets transmitted from the communication apparatus 1.

Further, if the respective peripheral devices simultaneously send packets in response to a plurality of multicast packets, network traffic is increased, and this may have an adverse effect on communication of other peripheral devices on the network.

FIG. 4B is a diagram illustrating an example where the communication apparatus 1 to which the thirteen IP addresses shown in FIG. 3 have been allocated transmits multicast packets according to an embodiment of the invention.

According to an embodiment of the invention, first, the multicast control unit 13 groups a plurality of IP addresses in a plurality based on predetermined criteria. For example, several groups are formed based on a scope of IP addresses or a kind of addressing of IP addresses, for example, whether an IP address allocated to the communication I/F 6 is an IPv4 address or an IPv6 address, what scope of an IP address the allocated IP address is, how the IP address is allocated, or the like.

Next, the multicast control unit 13 performs a control such that only one multicast packet is transmitted from one group at a certain time point. That is to say, the multicast control unit 13 makes a multicast packet transmitted to a predetermined multicast group using one IP address of a plurality of IP addresses belonging to each group as a transmission source. In addition, after the transmission is completed, the multicast control unit 13 makes a multicast packet transmitted using another IP address which has not been transmitted yet of the plurality of IP addresses belonging to the group, as a transmission source. Thereafter, the process is repeated until multicast packets are transmitted using all the IP addresses belonging to the group as transmission sources.

For example, in FIG. 4B, the thirteen IP addresses allocated to the communication apparatus 1 form five groups, an IPv4 group 401, an IPv6 link-local group 402, an IPv6 stateless group 403, an IPv6 stateful group 404, and an IPv6 manually-set group 405.

Here, the IPv4 group 401 is a group collecting IPv4 addresses. The IPv6 link-local group 402 is a group collecting IPv6 addresses which can be used only within the same network group (within a link-local group). The IPv6 stateless group 403 is a group collecting IPv6 addresses which are automatically allocated according to the RA function of the IPv6 supporting router. The IPv6 stateful group 404 is a group collecting IPv6 addresses which are automatically allocated by the DHCPv6 server 106. The IPv6 manually-set group 405 is a group collecting IPv6 addresses which are manually set by a user.

For example, in the IPv6 link-local group 402, the multicast control unit 13 first transmits a multicast packet to the multicast group address 21 using the "IP address 2-1" as a transmission source. After the transmission thereof is completed, a multicast packet is next transmitted using the "IP address 2-2" as a transmission source in the same manner. After the transmission thereof is completed, a multicast packet is finally transmitted using the "IP address 2-3" as a transmission source in the same manner. Thereby, one multicast packet can be transmitted from the IPv6 link-local group 402 at a certain time point, and multicast packets belonging to the IPv6 link-local group 402 can be transmitted using all the IP addresses as transmission sources.

In addition, the multicast control unit 13 makes multicast packets transmitted from the IPv4 group 401, the IPv6 stateless group 403, the IPv6 stateful group 404, and the IPv6 manually-set group 405 at the same time point as when multicast packets are transmitted from the IPv6 link-local group 402. In other words, it is possible to transmit multicast packets in parallel (in multi-tasking) between the groups.

Thereby, the number of multicast packets which are simultaneously transmitted from the communication apparatus 1 is a maximum of five which is the same as the number of the groups. Therefore, even the peripheral device 20 which simultaneously receives a maximum of ten can receive multicast packets transmitted from the communication apparatus 1 without losing the multicast packets.

Since the number of multicast packets which are simultaneously transmitted from the communication apparatus 1 is a maximum of five, network traffic is suppressed from being increased even if the peripheral device 20 sends response packets to the respective multicast packets.

FIGS. 5A to 5C are diagrams illustrating a screen display example when the communication apparatus 1 searches for the peripheral device 20 on the network. Hereinafter, FIG. 5 will be described.

FIG. 5A shows a screen display example when the communication apparatus does not find any peripheral device on the network. Here, when a user presses a "search" button 201, the communication apparatus starts to search for peripheral devices on the network. For example, the communication apparatus transmits multicast packets carrying a search request packet thereon to a predetermined multicast group address read from the storage device 4.

FIG. 5B shows a screen display example when the communication apparatus 1 receives a response packet to the search request packet from the peripheral device 20. The search application 11 of the communication apparatus 1 displays a list 210 of device names and IP addresses based on the device names and the IP addresses described in the response packet. Here, for example, if a user intends to know detailed information for the "printer 103", the user selects the "printer 103" from the list 210 via the input device 8 and presses a "detail" button 202, and thereby detailed information 220 for the printer 103 shown in FIG. 1 is displayed as shown in FIG. 5C. At this time, the search application 11 makes a request for detailed information using an IP address of the selected "printer 103" as a destination, thereby obtaining the detailed information 220 for the printer 103.

Thereby, the communication apparatus 1 can search for the peripheral device 20 on the network according to an operation of the user. In addition, the communication apparatus 1 can obtain detailed information for the peripheral device 20.

Figure 6:
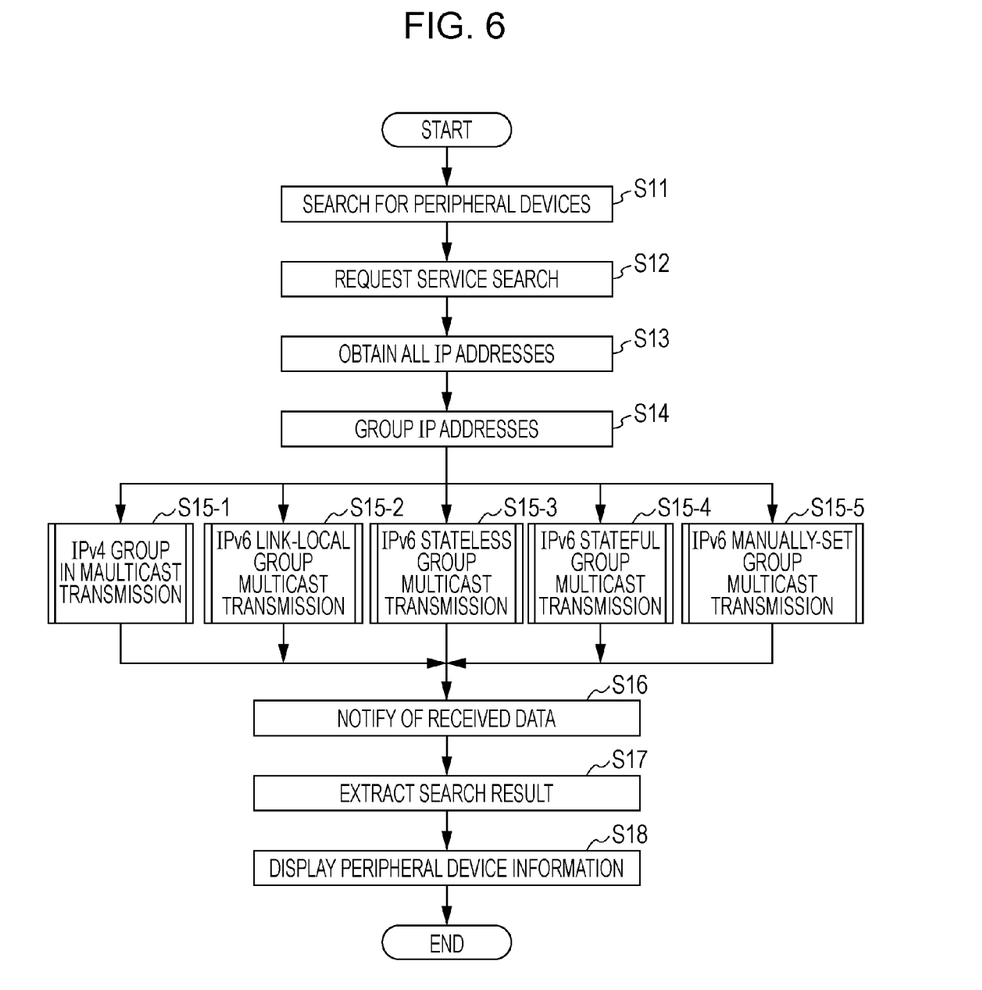
FIG. 6 is a flowchart illustrating processes when the communication apparatus searches for the peripheral device on the network.

FIG. 6 is a flowchart illustrating processes when the communication apparatus 1 searches for the peripheral device 20 on the network. Hereinafter, processes performed by the search application 11, the service search unit 12, the multicast control unit 13, and the OS 14 will be described with reference to FIG. 6.

If the "search" button 201 shown in FIG. 5A is pressed in the search application 11 (S11), the service search unit 12 requests the multicast control unit 13 to transmit a service search request packet in a multicast manner (S12).

The multicast control unit 13 receives the request and obtains all the IP addresses set in the communication I/F 6 via the OS 14 (S13). At this time, identification information for the communication I/F 6 (in a case where there are a plurality of communication I/Fs) and information for a kind of addressing of IP addresses (for example, an IPv6 stateless address, an IPv6 stateful address, or the like) are obtained together. For example, it is assumed that the multicast control unit 13 obtains a plurality of different IP addresses shown in FIG. 3.

In addition, the multicast control unit 13 groups a plurality of different IP addresses which have been obtained based on predetermined criteria (S14). Here, the grouping is performed so as to form IPv4 group 401, the IPv6 link-local group 402, the IPv6 stateless group 403, the IPv6 stateful group 404, and the IPv6 manually-set group 405 based on the information for a kind of addressing of IP addresses as shown in FIG. 4B.

In addition, the multicast control unit 13 performs a control such that only one multicast packet is transmitted from each group at a certain time point (S15-1 to S15-5). The multicast packet transmission is performed in parallel for the respective groups (that is, in multi-tasking). In other words, the number of multicast packets which are simultaneously transmitted from the communication apparatus 1 is a maximum of five. In addition, details of the process will be described later with reference to FIG. 7.

After transmission of multicast packets and reception of response packets thereto in all the groups are completed, the multicast control unit 13 reads all of the response packets which are stored in the storage device 4 by the respective groups, from the storage device 4, and then delivers the read response packets to the service search unit 12 (S16).

The service search unit 12 extracts information such as device names, IP addresses, and the like of the peripheral devices 20 from all the response packets delivered from the multicast control unit 13, and delivers the extracted information to the search application 11 (S17).

The search application 11 displays a list of the device names and the IP addresses of the peripheral devices 20 based on the information for the peripheral devices 20 as shown in FIG. 5B (S18).

Figure 7:
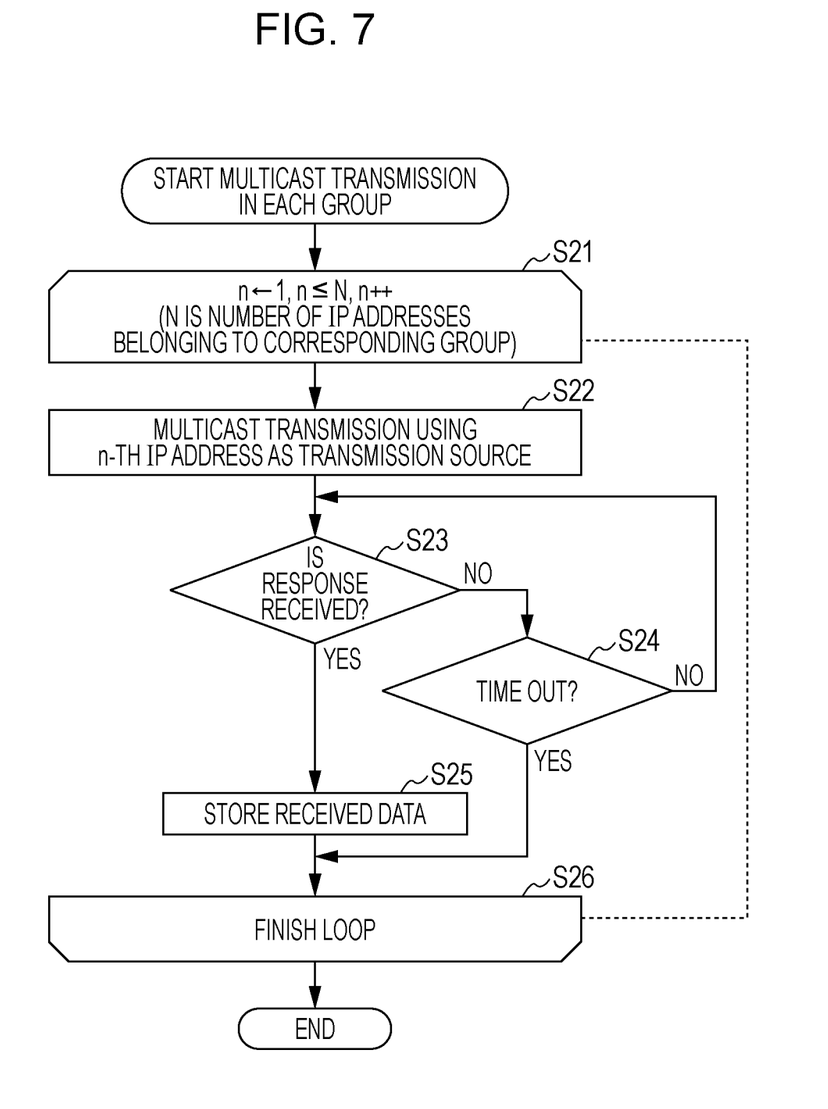
FIG. 7 is a flowchart illustrating processes when a multicast control unit makes each group transmit multicast packets.

FIG. 7 is a flowchart illustrating processes when the multicast control unit 13 makes each group transmit multicast packets. That is to say, FIG. 7 is a flowchart illustrating the process in step S15 of FIG. 6. In addition, the processes in steps S15-1 to S15-5 in the respective groups are common to each other. Hereinafter, the process in step S15 of FIG. 6 performed in a certain group will be described in detail with reference to FIG. 7.

The multicast control unit 13 sets n (where n is an integer) to 1, and starts N (where N is an integer) loops (S21). Here, N is the number of IP addresses belonging to the group.

The multicast control unit 13 selects the n-th IP address belonging to the group.

The multicast control unit 13 transmits a multicast packet to a predetermined multicast group address 21 which is a destination read from the storage device 4, using the selected IP address as a transmission source (S22).

The multicast control unit 13 waits for a response packet to the multicast packet to be received (S23). Here, if the response packet is not received (S23: NO) and a predetermined time-out time has elapsed from the transmission of the multicast packet (S24: YES), the multicast control unit 13 gives up waiting and starts a subsequent loop (S21). On the other hand, if the response packet is received (S23:YES), the response packet is stored in the storage device 4 (S25), and a subsequent loop is started (S21). If the N loops end (S26), the process finishes, and the flow proceeds to step S16 of FIG. 6.

In addition, in the embodiment, although reception of the response packet to the multicast packet is awaited in step S23, a response packet may be received in an asynchronous manner by transmitting the next multicast packet without waiting for the response packet.

As described above, through the processes shown in FIGS. 6 and 7, it is possible to restrict the number of multicast packets which are simultaneously transmitted by the communication apparatus 1. Thereby, the peripheral device 20 can receive a search packet without being lost. In addition, it is possible to suppress an increase in network traffic.

In FIGS. 6 and 7, the multicast control unit 13 makes only one multicast packet transmitted from each group at a certain time point, and thereby the respective groups transmit multicast packets in parallel (that is, in multi-tasking). Thereby, it is possible to restrict the number of multicast packets which are simultaneously transmitted at a certain time point. However, the number of multicast packets which are simultaneously transmitted at a certain time point may be restricted by another method. Next, an embodiment thereof will be described.

Figure 8:
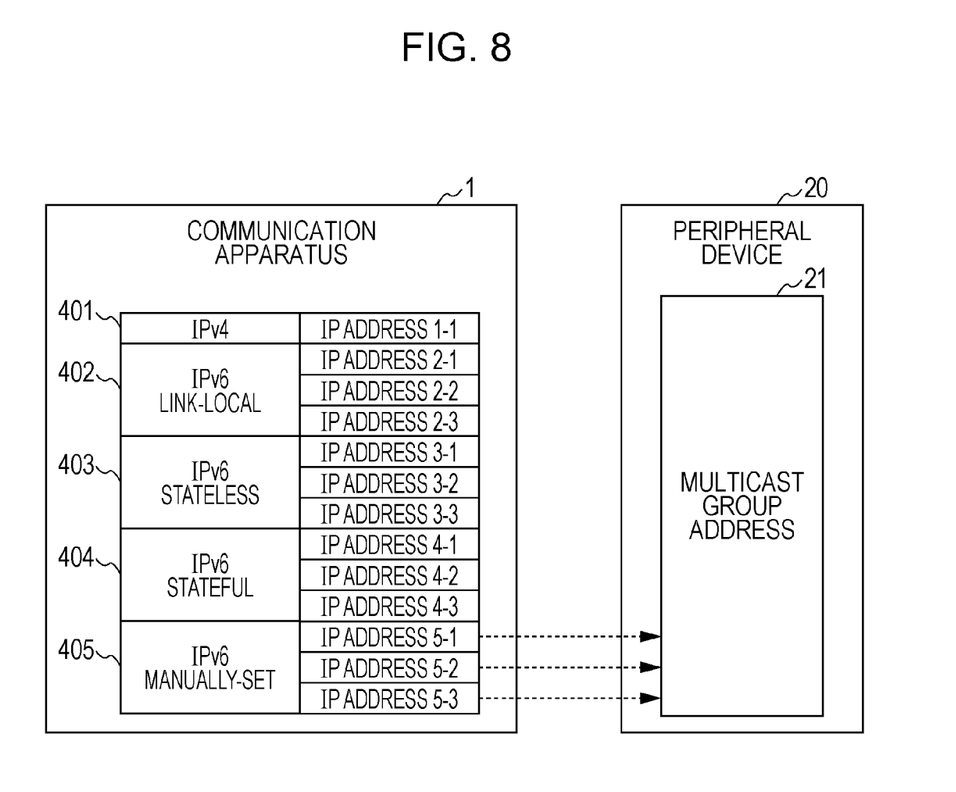
FIG. 8 is a diagram illustrating another embodiment in which the communication apparatus having a plurality of IP addresses transmits multicast packets to the peripheral device.

FIG. 8 is a diagram illustrating another embodiment in which the communication apparatus 1 having a plurality of IP addresses transmits multicast packets to the peripheral device 20. Hereinafter, another embodiment in which the number of multicast packets which are simultaneously transmitted at a certain time point is restricted will be described with reference to FIG. 8.

First, the multicast control unit 13 groups a plurality of different IP addresses allocated to the communication apparatus 1 based on a kind of addressing classification of IP addresses as shown in FIG. 4B. In addition, the multicast control unit 13 makes multicast packets transmitted from the groups having predetermined high priority.

For example, in FIG. 8, if the priority is high in an order of the IPv4 group 401, the IPv6 manually-set group 405, the IPv6 link-local group 402, the IPv6 stateless group 403, and the IPv6 stateful group 404, the IPv4 group 401 having the highest priority initially transmits multicast packets at the same time, and then the IPv6 manually-set group 405 having the next high priority transmits multicast packets at the same time. In other words, a plurality of IP addresses belonging to the same group become transmission sources in parallel (in multi-tasking) and multicast packets are transmitted at the same time.

For example, when the IPv6 manually-set group 405 transmits multicast packets, as shown in FIG. 8, the "IP address 5-1", the "IP address 5-2", and the "IP address 5-3" become transmission source at the same time, and the multicast packets are transmitted. In addition, if the transmission from the IPv6 manually-set group 405 is completed, the IP addresses belonging to the IPv6 link-local group 402 having the next high priority become transmission sources at the same time, and multicast packets are transmitted. Thereafter, this is repeated.

According to the above process, the maximum number of multicast packets which are simultaneously transmitted from the communication apparatus 1 is the number of IP addresses of a group to which the most IP addresses belong. For example, in the example shown in FIG. 8, the maximum number of multicast packets which are simultaneously transmitted is three.

Thereby, it is possible to restrict the number of multicast packets which are simultaneously transmitted by the communication apparatus 1 in the same manner as the cases in FIGS. 6 and 7.

The above-described embodiments of the invention are only an example and are not intended to limit the scope of the invention to the embodiments. A person skilled in the art may implement the invention in other various aspects without departing from the spirit of the invention.

For example, although transmission of multicast packets has been described in the embodiments, the invention may also be applied to transmission of packets other than the multicast packets.

The entire disclosure of Japanese Patent Application No. 2011-023766, filed Feb. 7, 2011 is expressly incorporated by reference herein.

What is claimed is:

1. A network communication apparatus which can transmit multicast packets comprising:
    a communication interface unit that has a plurality of IP addresses allocated to the communication interface unit and transmits the multicast packets; and
    a multicast control unit that controls the communication interface unit and groups the plurality of IP addresses into a plurality of groups including a first group and a second group based on predetermined criteria, wherein the multicast control unit sequentially transmits the multicast packets using one IP address belonging to the first group as a transmission source such that after transmission of one multicast packet is complete, another multicast packet is transmitted using another IP address belonging to the first group as a transmission source address, the transmission source representing where the multicast packet is transmitted from,
    wherein the multicast control unit sequentially transmits the multicast packets using one IP address belonging to the second group as a transmission source address such that after transmission of one multicast packet is complete, another multicast packet is transmitted using another IP address belonging to the second group as a transmission source address, and
    wherein the transmission source address represents where the multicast packet is transmitted from, and
    wherein each of the first group and the second group include a plurality IP addresses.

2. The network communication apparatus according to claim 1, the criteria when the multicast control unit performs the grouping is a kind of addressing classification of each IP address.

3. The network communication apparatus according to claim 1, wherein the multicast packets have search data for searching for devices or services present on a network.

4. The network communication apparatus according to claim 3, wherein, after a predetermined time-out time has elapsed in the first group, the multicast control unit transmits the multicast packet using an IP address which belongs to the first group and has not been used to transmit a multicast packet yet, as a transmission source.

5. The network communication apparatus according to claim 4, wherein a device of a destination of the multicast packet having the search data is a peripheral device on the network communication apparatus having a multicast group address.

6. The network communication apparatus according to claim 1, wherein the IP address used as a transmission source of the multicast packet is one of IPv4 and IPv6.

7. A method for network communication performed by an information processing apparatus which is connected to a network and can execute a predetermined program, the information processing apparatus including a communication interface unit that has a plurality of IP addresses allocated to the communication interface unit and transmits the multicast packets, the method comprising:
    grouping the plurality of IP addresses into a plurality of groups including a first group and a second group based on predetermined criteria, wherein the multicast control unit sequentially transmits the multicast packets using one IP address belonging to the first group as a transmission source such that after transmission of one multicast packet is complete, another multicast packet is transmitted using another IP address belonging to the first group as a transmission source address, the transmission source representing where the multicast packet is transmitted from; and
    sequentially transmitting the multicast packets using one IP address belonging to second group as a transmission source address such that after transmission of one multicast packet is complete, a multicast packet is transmitted using another IP address belonging to the second group as a transmission source,
    wherein the transmission source address represents where the multicast packet is transmitted from, and
    wherein each of the first group and the second group include a plurality IP addresses.

8. The network communication apparatus of claim 1, wherein the multicast packets are transmitted in parallel for the groups of plurality of IP addresses.

9. The method of claim 7, wherein the multicast packets are transmitted in parallel for the groups of plurality of IP addresses.

* * * * *